United States Patent [19]

Halligan et al.

[11] Patent Number: 6,141,707

[45] Date of Patent: Oct. 31, 2000

[54] INPUT/OUTPUT REQUEST ALLOCATION BY ESTABLISHING MASTER COMMAND QUEUE AMONG PLURALITY OF COMMAND QUEUES TO RECEIVE AND STORE COMMANDS, DETERMINE LOGICAL VOLUME, AND FORWARDING COMMAND TO DETERMINED LOGICAL VOLUME

[75] Inventors: Kenneth Halligan, Leominster; Erez Ofer, Brookline, both of Mass.

[73] Assignee: EMC Corporation, Hopkinton, Mass.

[21] Appl. No.: 09/085,719

[22] Filed: May 28, 1998

[51] Int. Cl.$^7$ ........................................................ G06F 3/00
[52] U.S. Cl. ............................... 710/36; 710/39; 711/112; 711/114; 714/6; 714/7
[58] Field of Search ................................. 710/1, 36, 39; 711/112, 114; 714/7, 6

[56] References Cited

U.S. PATENT DOCUMENTS

| | | | |
|---|---|---|---|
| 3,699,530 | 10/1972 | Capowski et al. | 340/172.5 |
| 5,581,735 | 12/1996 | Kajitani et al. | 395/496 |
| 5,777,987 | 7/1998 | Adams et al. | 370/336 |
| 5,809,224 | 9/1998 | Schultz et al. | 395/182.05 |
| 5,911,051 | 6/1999 | Carson et al. | 395/287 |
| 5,937,428 | 8/1999 | Jantz | 711/114 |
| 5,974,502 | 10/1999 | DeKoning et al. | 711/114 |

*Primary Examiner*—Thomas C. Lee
*Assistant Examiner*—Rehana Perveen
*Attorney, Agent, or Firm*—Fish & Richardson P.C.

[57] ABSTRACT

A method and apparatus provide input/output allocation between a host and a data storage system. Input/output allocation is accomplished by organizing logical volumes (e.g., disk drives) in the data storage system and queuing requests to the data storage system in a manner which increases the speed and throughput of input/output (I/O) operations. The data storage system is provided from a plurality of logical volumes, each of the logical volumes including a command queue. A master command queue is established from one of the command queues of the logical volumes. The master command queue receives command requests from the host, each command request including an address of data being requested. Each command request is received from the host and stored in the master command queue. The logical volume where the address of the data associated with each command request resides is determined. Each command request is then forwarded to the logical volume where the data being requested resides.

13 Claims, 4 Drawing Sheets

INPUT/OUTPUT REQUEST ALLOCATION BY ESTABLISHING MASTER COMMAND QUEUE AMONG PLURALITY OF COMMAND QUEUES TO RECEIVE AND STORE COMMANDS, DETERMINE LOGICAL VOLUME, AND FORWARDING COMMAND TO DETERMINED LOGICAL VOLUME

BACKGROUND OF THE INVENTION

The invention relates generally to methods and apparatus for improving performance of a mass storage system.

Disk drive systems have grown enormously in both size and sophistication in recent years. These systems can typically include many large disk drive units controlled by a complex, multi-tasking, disk drive controller such as the EMC Symmetrix disk drive controller (a product of EMC Corporation, Hopkinton, Mass.). A large scale disk drive system can typically receive commands from a number of host computers and can control a number of disk drive mass storage devices, each mass storage device capable of storing in excess of several gigabits of data.

There is every reason to expect that both the sophistication and the size of the disk drive systems will continue to increase. As these systems increase in complexity, so does the user's reliance upon the systems, for fast and reliable access, recovery, and storage of data. Accordingly, the user typically uses data throughput and speed of response as a primary criteria for evaluating performance of the disk drive systems. As a result, mass storage devices and the controllers which drive them have become quite sophisticated in trying to improve command response time. Systems such as the EMC Symmetrix disk drive controller system thus incorporate a large cache memory, and other techniques to improve the system throughput.

SUMMARY OF THE INVENTION

The invention relates to providing input/output allocation between a host and a data storage system. Input/output allocation is accomplished by organizing logical volumes (e.g., disk drives) in the data storage system and queuing requests to the data storage system in a manner which increases the speed and throughput of input/output (I/O) operations.

In a general aspect of the invention, the method includes the following steps. The data storage system is provided from a plurality of logical volumes, each of the logical volumes including a command queue. A master command queue is established from one of the command queues of the logical volumes. The master command queue receives command requests from the host, each command request including an address of data being requested. Each command request is received from the host and stored in the master command queue. The logical volume where the address of the data associated with each command request resides is then determined. Each command request is then forwarded to the logical volume where the data being requested resides.

In essence, the invention provides to one or more hosts, a data storage system in the form of a "meta-device" consisting of any number of logical volumes. The meta-device allows incoming command requests to be distributed (if necessary) to the logical volumes where they can be executed in parallel, rather than in serial fashion. Because the command requests are handled in parallel, throughput is increased significantly and in proportion to the number of logical volumes in the meta-device. Thus, a greater amount of storage is made available to the hosts, while the speed at which access to data in the storage system is made is significantly increased. Moreover, from the standpoint of the host, a single large data storage system, rather than a multitude of smaller storage systems is provided.

Embodiments of the invention may include one or more of the following features.

When the data being requested does not reside on the logical volume of the master command queue, each command request includes mapping a local address of the logical volume where the data being requested resides. The invention allows a next command request from the host to be received and executed while the logical volume which received the previous command request obtains data at the local address of the logical volume.

The method includes preventing simultaneous transfer of data between the host and at least two of the logical volumes, in order to prevent data corruption in the event that one logical volume is already using the bus network to transfer data to a host. To further improve throughput, data stored onto the logical volumes is partitioned in sections having a predetermined unit size, configurable by the user. Sequential sections are stored on different logical volumes, thereby minimizing the possibility that consecutive command requests require accessing the same logical volume. The unit size can be in a range between 256 megabytes and 4,096 megabytes. Along with the address of the data being requested, each command request also includes a number of blocks of data being requested.

In another aspect of the invention, the invention is a computer-readable medium which stores a computer program for providing input/output allocation between a host and a data storage system. In a preferred embodiment, the computer-readable medium is an electrically erasable programmable read-only memory (EEPROM). The stored program includes computer-readable instructions: (1) which provide the data storage system from a plurality of logical volumes, each of the logical volumes including a command queue; (2) establishes a master command queue from one of the command queues of one of the logical volumes, the master command queue receiving command requests from the host, each command request including an address of data being requested; (3) receives each command request from the host and stores the command request in the master command queue; (4) determines the logical volume where the address of the data associated with each command request resides; and (5) forwards each command request to the logical volume where the data being requested resides.

A computer-readable medium includes any of a wide variety of memory media such as RAM or ROM memory, as well as, external computer-readable media, for example, a computer disk or CD ROM. A computer program may also be downloaded into a computer's temporary active storage (e.g., RAM, output buffers) over a network. For example, the above-described computer program may be downloaded from a Web site over the Internet into a computer's memory. Thus, the computer-readable medium of the invention is intended to include the computer's memory which stores the above-described computer program that is downloaded from a network.

In another aspect of the invention, a disk controller includes memory, a portion of which stores the computer program described above, a processor for executing the computer-readable instructions of the stored computer program and a bus connecting the bus to the memory.

Other advantages and features will become apparent from the following detailed description and from the claims.

DETAILED DESCRIPTION

Figure 1:
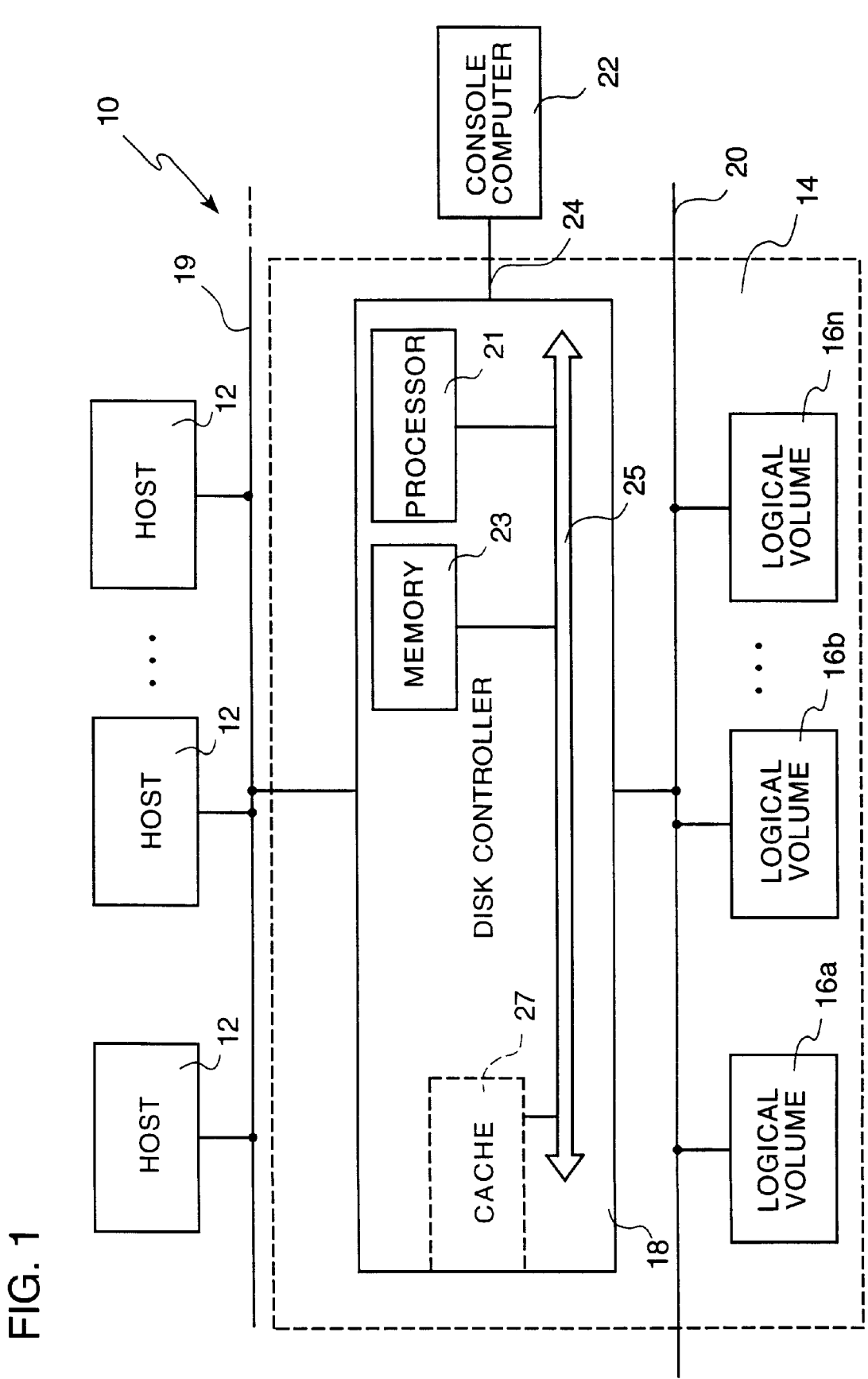
FIG. 1 is a block diagram illustrating the disk storage element/host computer system with which the invention is particularly useful.

Referring to FIG. 1, a computer system 10 includes at least one, and more likely several of host computers or processors 12 connected to a mass storage system 14 which includes a plurality of logical volumes 16a, 16b, . . . , 16n. Each logical volume may be representative of one or more physical disk drive elements. Alternatively, a logical volume may represent a portion of a physical disk drive element with several of the logical volumes constituting a drive element. In this case, each physical drive has a number of logical volumes, for example, four, eight, or more logical volumes in a single physical disk drive element.

Interconnecting the host computers and the logical volumes is a disk drive controller 18, for example that which is manufactured by EMC Corporation, Hopkinton, Mass. Disk drive controller 18 receives memory commands, for example read and write commands from host computers 12 over a bus 19 operating in accordance with a SCSI protocol. Disk drive controller 18 includes a processor 21 for executing computer instructions associated with the operation described below. The computer instructions are stored in a memory 23 (e.g., EEPROM) connected to processor 21 via an internal bus 25. Disk drive controller 18 delivers data associated with those commands to or from an appropriate one of logical volumes 16a, 16b, . . . 16n over a second bus 20 which, for example, also operates in accordance with a SCSI protocol.

Each of logical volumes 16a, 16b, . . . 16n typically represents a relatively large amount of memory (e.g., 1 gigabit or more). Logical volumes 16a, 16b, . . . 16n together, in aggregate, define a large mass storage device (referred to here as a "meta device" 30) having a memory capacity equal to the sum of each of the logical volumes. From the perspective of the hosts, it is meta device 30 (and not the individual logical devices) that each of hosts 12 perceives as the destination of their command requests.

Disk drive controller 18 also includes a cache memory 27 where data accessed from any of logical volumes 14 is stored. Cache memory 27 stores recently acquired data thereby improving throughput when data already residing in the cache memory is requested. In a typical configuration, controller 18 is also connected to a console computer 22 through a connecting bus 24. Console PC 22 is used for maintenance and access to the controller and can be employed to set parameters of and/or to initiate maintenance commands to the controller, under user control, as is well known in the art.

During operation of system 10, a host 12 will initiate many command requests to disk controller 14 for the purpose of reading data from or writing data to one of logical volumes 16a, 16b, . . . 16n. In a conventional scheme, the command requests (i.e., read or write requests) are accepted and executed by disk controller 18 in a serial manner, on a first-come first-served basis. The result of this approach, however, is that a command request for data on a particular logical volume must be executed to completion before the start of a next command request can be executed.

To increase throughput performance of system 10, a master command queue is established in one of the logical volumes to receive all command requests from hosts 12. Disk drive controller 14 then determines which of the logical volumes the command request is to be executed by and forwards the command request to that logical volume for execution, thereby allowing a next command request to be received, forwarded and executed substantially in parallel with the first request. As a result, in accordance with the invention, system throughput is significantly improved.

Figure 2:
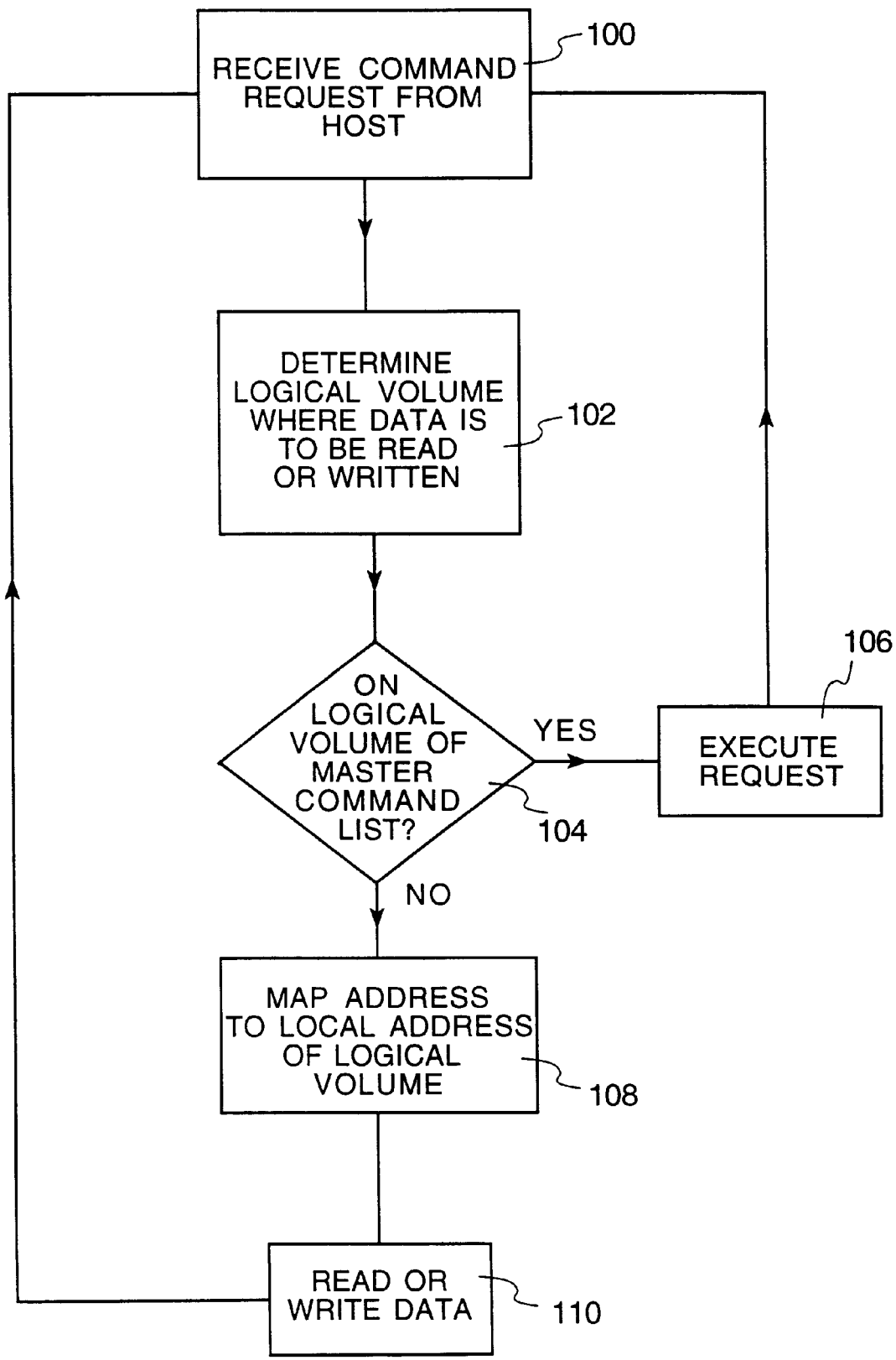
FIG. 2 is a flow chart illustrating typical operation of the system in accordance with the invention.

Referring to FIG. 2, the basic operation includes receiving a first command request (step 100). As stated above, disk controller 14 then determines which logical volume includes the data required by the command request (step 102). If the data being requested is on logical volume 16a associated with master command queue 30 (step 104), the command request is simply executed (step 106) and a next command request is received. On the other hand, if the command request is for data that is not on logical volume 16a, disk drive controller 14 first identifies which of the remaining logical volumes 16b, 16c the data resides on, and then changes the address of the data to properly refer to the address of that particular logical volume (step 108). The command request is then executed (step 110) and a next command request is received.

Figure 3:
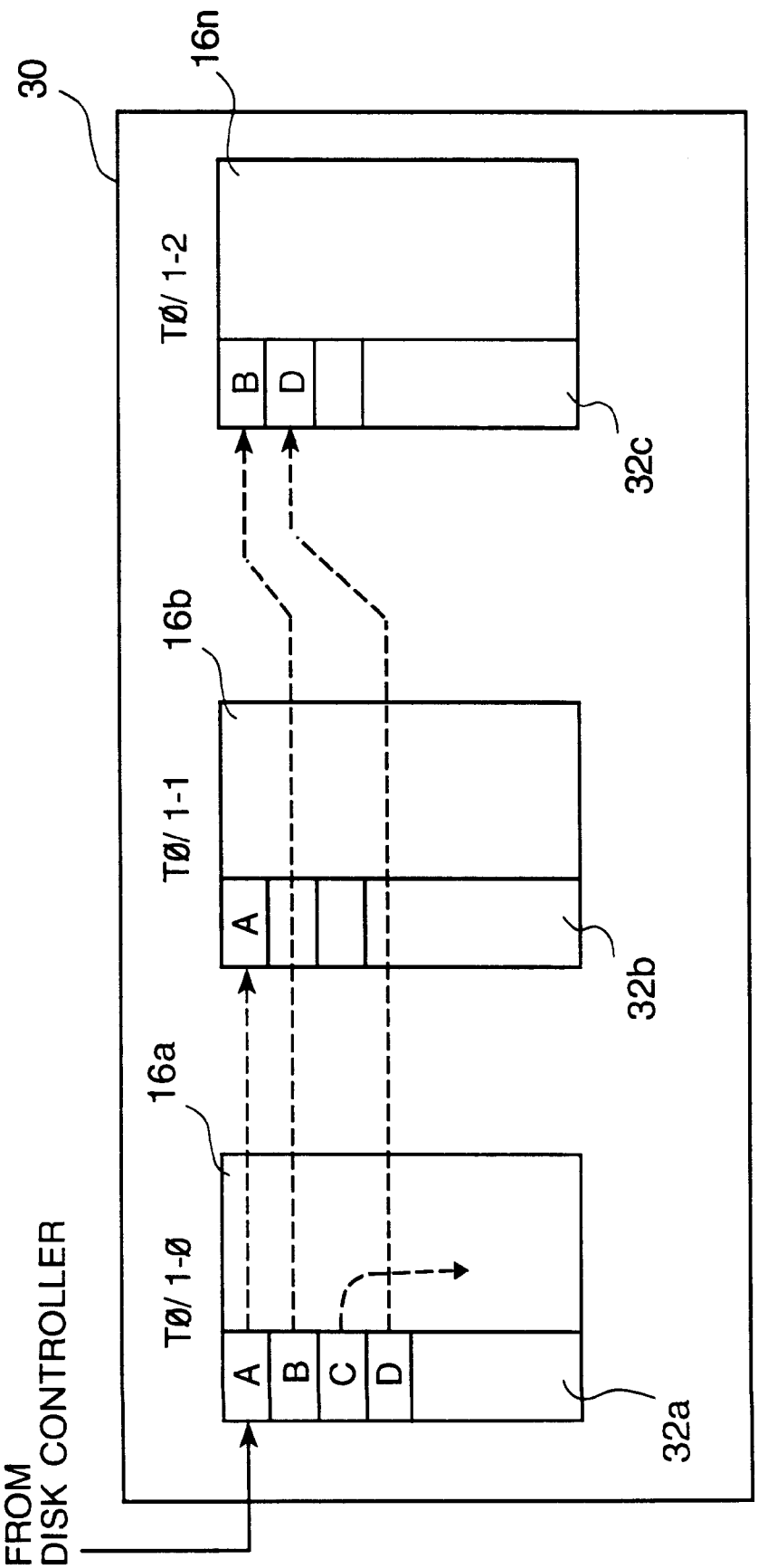
FIG. 3 is a functional block diagram representing the logical volumes of the system shown in FIG. 1.

Referring to FIG. 3, meta device 30 includes three logical volumes 16a, 16b, and 16c. For purposes of this example, logical volumes are labelled T0/1_0, T0/1_1, and T0/1_2, respectively, and are each presumed to have 500 blocks of data. Hosts 12, however, only see a meta device (labelled T0) and having 1,500 blocks. Each logical volume 16a, 16b, and 16c includes a corresponding command queue 32a, 32b, and 32c. In this example, command queue 32a is designated as the master command queue for receiving all command requests from hosts 12.

The steps set forth in the flowchart shown in FIG. 2 can be used in conjunction with the example depicted in FIG. 3. In particular, a first command request (labelled A) is received by master command queue 32 of logical volume 16a (T0/1_0). Command request A is a request for reading data stored on logical volume 16b (T0/1_1). Disk controller 14, therefore, changes the address in the command request to the corresponding address on logical volume 16b and forwards the request to command queue 32b. While logical volume 16b begins execution of the read request it has just received, a next command request (labelled B) in master command queue is forwarded to command queue 32c of logical volume 16c where it is to be executed. Similarly, and in parallel, a third command request (labelled C) is identified as being associated with data residing on logical volume 16a where it is to be executed. A fourth command request (labelled D) in master command queue is then forwarded to command queue 32c of logical volume 16c where it awaits execution upon completing execution of command request B.

Although command requests can be executed in parallel by the different logical volumes simultaneous transfers of data between meta device 30 and hosts 12 over busses 19, 20 is prohibited so that the integrity of the data is preserved. To prevent simultaneous transfer, a locking mechanism is used so that only one logical volume is allowed to use bus 20 at any given time. During this period, other logical volumes must wait until the particular logical volume using the bus completes transferring its data. It is important to appreciate that access to busses 19, 20 does not depend on the particular order in which command requests are received and distributed by the master command queue. Other factors affect when a particular logical volume will require access to the busses for transferring data, including whether data is available in cache memory 27, the location on the disk drive element (e.g., cylinder), position of the head of the disk drive element, etc.

For example, after a logical volume has retrieved data requested by a host 12 (a read request), the logical volume must first check to see whether busses 19, 20 are available to transfer the data back to the requesting host. The same is true for write command requests since the logical volume provides a return message to the host making the command request that writing of the data has, in fact, been completed. Thus, in accordance with the invention, busses 19, 20 are protected by a locking mechanism referred to as a "meta-lock". Unless busses 19, 20 are available, an attempt to obtain the meta-lock will be denied. In this case, a "task 10" will issued by the meta-lock and the logical volume must periodically poll for the meta-lock. Once the active logical volume has completed its input/output operation, the logical volume releases the meta-lock to the next logical volume awaiting use of busses.

It is not uncommon that consecutive command requests be associated with a data blocks from the same logical volume. This is particularly true for input/output requests involving a large block of data. In these situations, command requests received by the logical volume associated with the data, are executed serially with subsequent command requests stored within the command queue. In order to further increase the throughput of computer system 10, in one embodiment of the invention, data blocks are written across the logical volumes of the meta device in striped manner.

Figure 4:
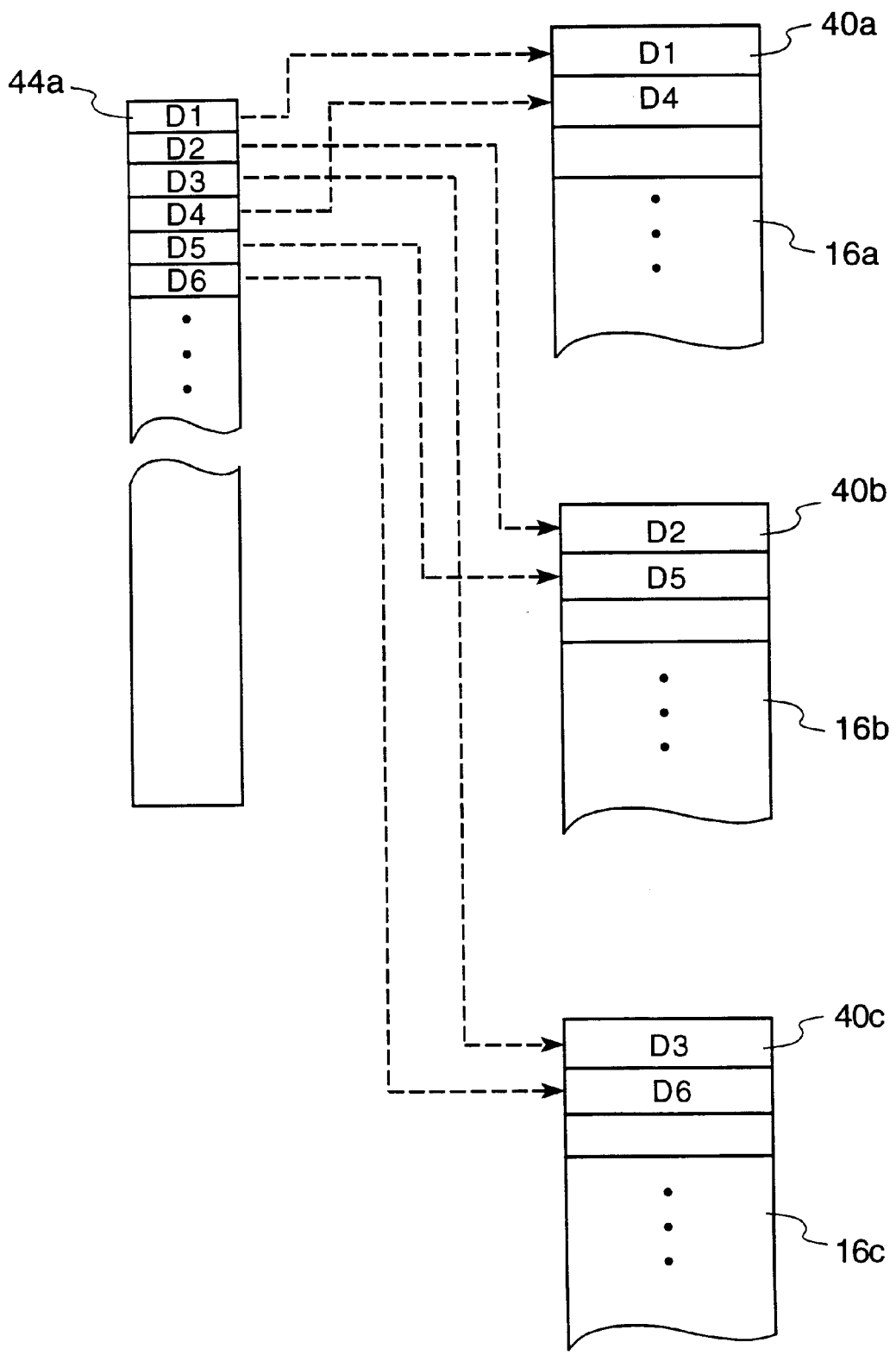
FIG. 4 is a diagram illustrating a preferred manner in which data is stored on the logical volumes of FIG. 1.

For example, referring to FIG. 4, logical volumes 16a, 16b, 16c are shown partitioned into segments 40 (e.g., cylinders of a disk drive element or a portion thereof). The size of the segments is configurable by the user, for example, in a range between 256 megabytes and 4,096 megabytes. In one example, each segment 40 is capable of storing 960 blocks of data. A file 42, for example, may include many more blocks than can be stored in a single segment 40 of a logical volume. One option would be to write the blocks of data serially within logical volume 16a until the volume is completely filled and, if more space is needed, continuing to write remaining blocks of data into logical volume 16b. This approach, however, leads to the problem discussed above in the preceding paragraph. That is, throughput will be decreased because command requests for the data blocks of file 42 must be handled by the same logical volume. A preferred alternative is to write file 42 into the meta device in sections 44 commensurate in size with segments 40. Thus, as shown in FIG. 4, a first section 44a (labelled D1) of 960 blocks of data is written into a first segment 40a of logical volume 16a and a second section 44b (labelled D2) is written into a first segment 40b of logical volume 16b. This process continues until the entire file is written across logical volumes 16a, 16b, 16c.

It should be appreciated that the more logical volumes used in the meta device, the less likely that consecutive command requests will be associated with data blocks from the same logical volume. Further, segments 40 can be configured to any present size depending on the particular application.

Additions, subtractions, and other modifications of the disclosed preferred particular embodiments of the invention will be apparent to those practicing the field and are within the scope of the following claims.

What is claimed is:

1. A method of providing input/output allocation between a host and a data storage system, the method comprising:

providing the data storage system from a plurality of logical volumes, each of the logical volumes including a command queue;

establishing a master command queue from one of the command queues of one of the logical volumes, the master command queue for receiving command requests from the host, each command request including an address of data being requested;

receiving each command request from the host and storing the command request in the master command queue;

determining the logical volume where the address of the data associated with each command request resides; and forwarding each command request to the logical volume where the data being requested resides.

2. The method of claim 1 wherein the step of forwarding each command request includes mapping a local address of the logical volume where the data being requested resides.

3. The method of claim 2 further comprising receiving and executing a next command request from the host while the logical volume which received the previous command request obtains data at the local address of the logical volume.

4. The method of claim 1 further comprising preventing simultaneous transfer of data between the host and at least two of the logical volumes.

5. The method of claim 1 further comprising partitioning data to be stored onto the plurality of logical volumes in sections of a predetermined unit size, sequential sections being stored on different logical volumes.

6. The method of claim 5 wherein the predetermined unit size is in a range between 256 megabytes and 4,096 megabytes.

7. The method of claim 1 wherein each of the plurality of logical volumes is a disk drive element.

8. The method of claim 1 wherein each command requests includes a number of blocks of data being requested providing input/output allocation between a host and a data storage system.

9. A computer-readable medium storing a computer program which is executable on a computer including a memory, the computer program for providing input/output allocation between a host and a data storage system, the stored program comprising:

computer-readable instructions which configure the data storage system from a plurality of logical volumes, each of the logical volumes including a command queue;

computer-readable instructions which establish a master command queue from the command queue of one of the logical volumes, the master command queue for receiving command requests from the host, each command request including an address of data being requested;

computer-readable instructions which receive each command request from the host and store the command request in the master command queue;

computer-readable instructions which determine the logical volume where the address of the data associated with each command request resides; and computer-readable instructions which forward each command request to the logical volume where the data being requested resides.

10. The computer-readable medium of claim 9 wherein the stored program further comprises computer instructions which change the address of the logical volume provided by the host to a local address of the logical volume where the data being requested resides.

11. The computer-readable medium of claim 9 wherein the stored program further comprises computer instructions which prevent simultaneous transfer of data between the host and at least two of the logical volumes.

12. The computer-readable medium of claim 9 wherein the stored program further comprises computer instructions which partition data to be stored onto the plurality of logical volumes in sections of a predetermined unit size, sequential sections being stored on different logical volumes.

13. A disk controller comprising:

memory, a portion of said memory storing a computer program for providing input/output allocation between a host and a data storage system, the stored program comprising:

computer-readable instructions which configure the data storage system from a plurality of logical volumes, each of the logical volumes including a command queue;

computer-readable instructions which establishes a master command queue from one of the command queues of one of the logical volumes, the master command queue for receiving command requests from the host, each command request including an address of data being requested;

computer-readable instructions which receives each command request from the host and stores the command request in the master command queue;

computer-readable instructions which determines the logical volume where the address of the data associated with each command request resides; and computer-readable instructions which forwards each command request to the logical volume where the data being requested resides;

a processor to execute said computer-readable instructions; and at least one bus connecting the memory to the processor.

* * * * *